(12) United States Patent
Chai et al.

(10) Patent No.: US 9,552,161 B2
(45) Date of Patent: Jan. 24, 2017

(54) REPETITIVE DATA BLOCK DELETING SYSTEM AND METHOD

(71) Applicant: Shenzhen Airdrawing Technology Service Co., Ltd, Shenzhen (CN)

(72) Inventors: Zhi-Quan Chai, Shenzhen (CN); Da-Peng Li, Shenzhen (CN); Hai-Hong Lin, Shenzhen (CN); Chung-I Lee, New Taipei (TW)

(73) Assignee: Shenzhen Airdrawing Technology Service Co., Ltd, Shenzhen (CN)

( * ) Notice: Subject to any disclaimer, the term of this patent is extended or adjusted under 35 U.S.C. 154(b) by 509 days.

(21) Appl. No.: 14/065,490

(22) Filed: Oct. 29, 2013

(65) Prior Publication Data
US 2014/0164339 A1    Jun. 12, 2014

(30) Foreign Application Priority Data
Dec. 12, 2012 (CN) .......................... 2012 1 0534073

(51) Int. Cl.
*G06F 17/30* (2006.01)
*G06F 3/06* (2006.01)
(52) U.S. Cl.
CPC ............. *G06F 3/0608* (2013.01); *G06F 3/067* (2013.01); *G06F 3/0641* (2013.01); *G06F 17/30156* (2013.01)

(58) Field of Classification Search
CPC .. G06F 3/0608; G06F 17/30156; G06F 3/067; G06F 3/0641
USPC ......................................................... 707/692
See application file for complete search history.

(56) References Cited

U.S. PATENT DOCUMENTS

| 8,930,648 | B1 * | 1/2015 | Storer | G06F 12/0292 711/154 |
| 2008/0005141 | A1 * | 1/2008 | Zheng | G06F 3/0608 |
| 2010/0332401 | A1 * | 12/2010 | Prahlad | G06F 17/3002 705/80 |
| 2013/0339298 | A1 * | 12/2013 | Muller | G06F 17/30283 707/640 |

FOREIGN PATENT DOCUMENTS

| CN | 101183323 A | 5/2008 |
| CN | 101917396 A | 12/2010 |

* cited by examiner

*Primary Examiner* — Evan Aspinwall
(74) *Attorney, Agent, or Firm* — Zhigang Ma

(57) ABSTRACT

An analysis device obtains hash lists from databases of a server cluster. The analysis device determines repetitive hash values and repetitive data blocks. The analysis device deletes the repetitive data blocks from servers of the server cluster.

15 Claims, 5 Drawing Sheets

REPETITIVE DATA BLOCK DELETING SYSTEM AND METHOD

BACKGROUND

1. Technical Field

The embodiments of the present disclosure relate to management technology, and particularly to a repetitive data block deleting system and method.

2. Description of Related Art

A data center is a facility which houses a large number of computers and stores huge amounts of data. By using cloud computing, the files are uploaded into a data center. However, at present, a file stored in the data center may include one or more same portions, which waste a lot of storage spaces. Therefore, there is room for improvement in the art.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
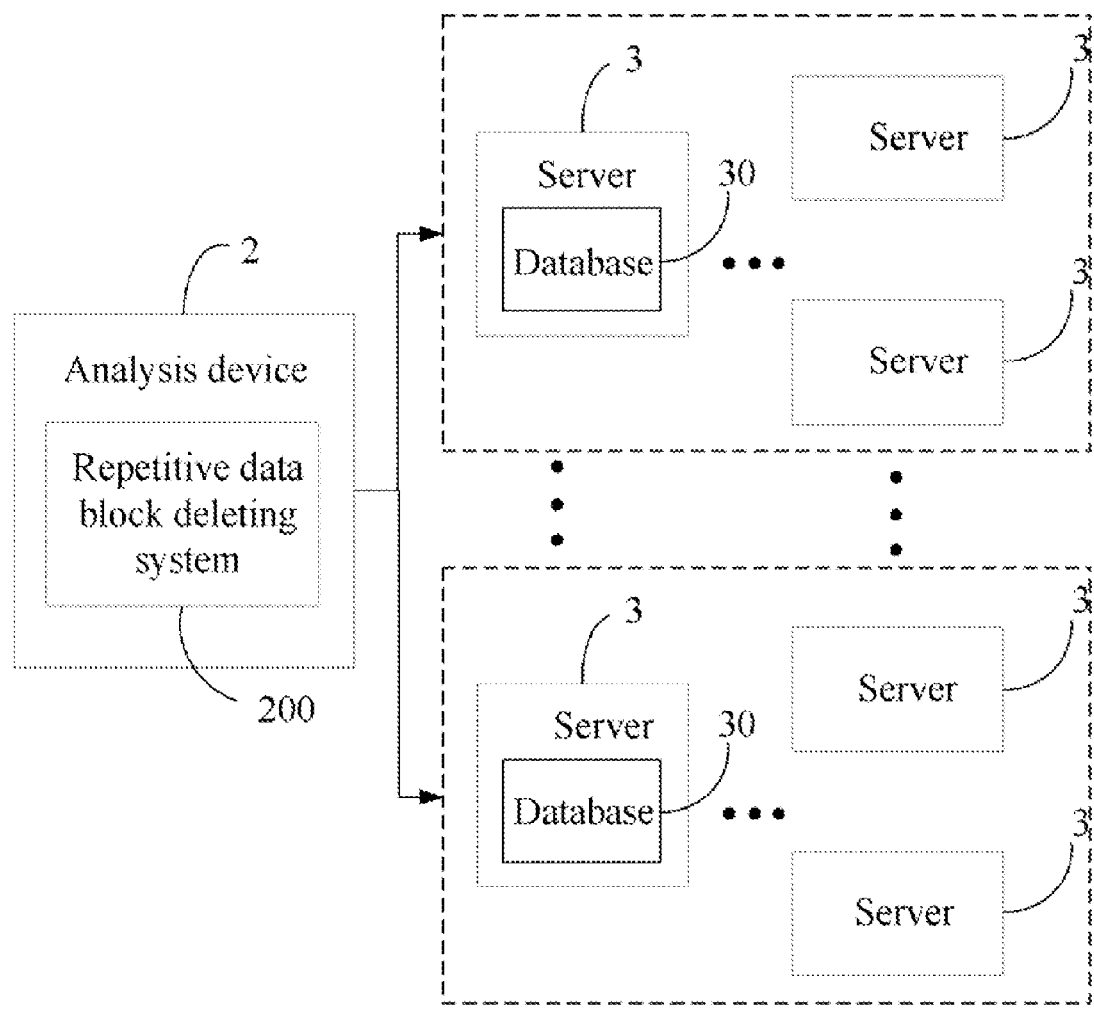
FIG. 1 is a block view of one embodiment of an analysis device including a repetitive data block deleting system.
Figure 4:
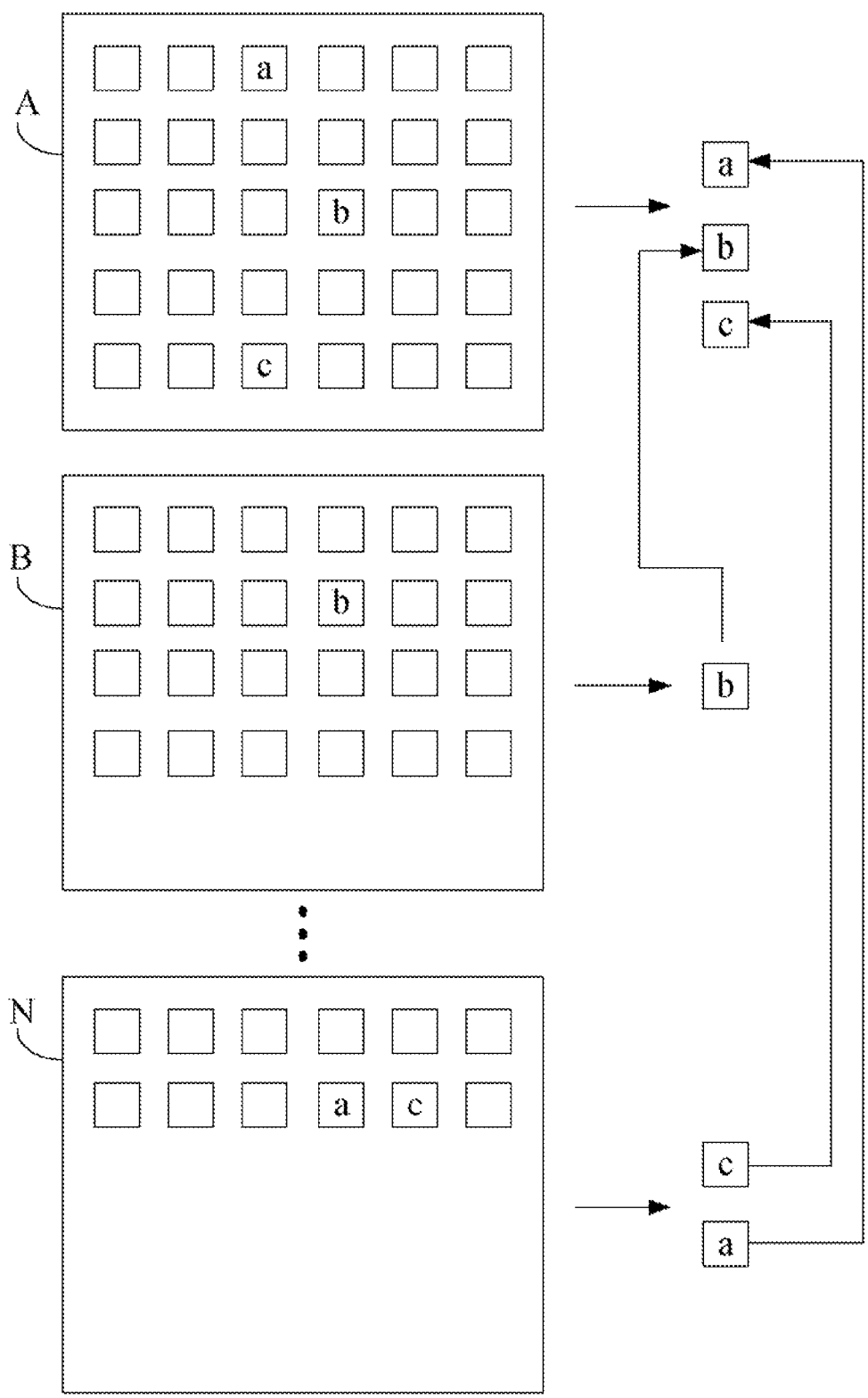
FIG. 4 illustrates one embodiment of deleting repetitive data blocks from one or more servers.

FIG. 1 is a block diagram of one embodiment of an analysis device 2. In this embodiment, the analysis device 2 includes a repetitive data block deleting system 200. The analysis device 2 connects to one or more servers 3 via a network (e.g., the Internet or a local area network). The analysis device 2 may provide a user interface, which is displayed on a display device of the analysis device 2, for a user to access the one or more servers 3 and control one or more operations of the one or more servers 3. The user may input an ID and a password using an input device (e.g., a keyboard) into the user interface to access the one or more servers 3. The analysis 2 may be, but is not limited to, a tablet computer, a personal computer, a laptop computer or other data-processing apparatus. The database 30 may be integrated with the server 3 as shown in FIG. 4. The database 30 also may be an independent device separated from the server 3, and the server 3 is connected to the database 30 using a data connectivity, such as open database connectivity (ODBC) or JAVA database connectivity (JDBC), for example. Each server 3 stores data blocks of files. In other words, each file is divided into two or more data blocks, and the two or more data blocks are stored in the server 3. The database 30 serves one or more servers 3, and the database 30 is in service for the one or more servers 3. For example, when the database 30 serves one server 3, the database 30 is in service of the one server 3. When the database 30 serves two or more servers 3, the database 30 is in service of the two or more servers 3. Each server 3 may include one or more storage spaces. The data blocks of the files are stored in the one or more storage spaces. The one or more servers 3 may be included in a server cluster (e.g., a data center). The server cluster may be connected to one or more clients (e.g., a smart phone, a tablet computer, or a personal computer), each client is capable of downloading the files from the server cluster.

The database 30 includes one or more hash list. Each hash list corresponds to a file. The hash list corresponding to the file includes a hash value of each data block of the file, and a name of each data block of the file. The hash list also includes information of the file. The information of the file includes a name of the file and an attribute of the file. Furthermore, each data block includes a name. The name of each data block is generated in order and also saved into the hash list. In detail, the name of each data block is generated in an alphabetical order (e.g., "a," "b," "c," "d," "d," or "f") or in a numerical order (e.g., "1," "2," "3," or "4"). For example, the file is divided to three data blocks, namely data block "a," data block "b," and data block "c." Each data block may include a storage capacity predetermined by a user, such as 16 KB, 32 KB, 64 KB, 128 KB, or 256 KB. For example, if the storage capacity is predetermined as 32 KB, the file is divided into a plurality of data blocks, and each data block is 32 KB.

Figure 2:
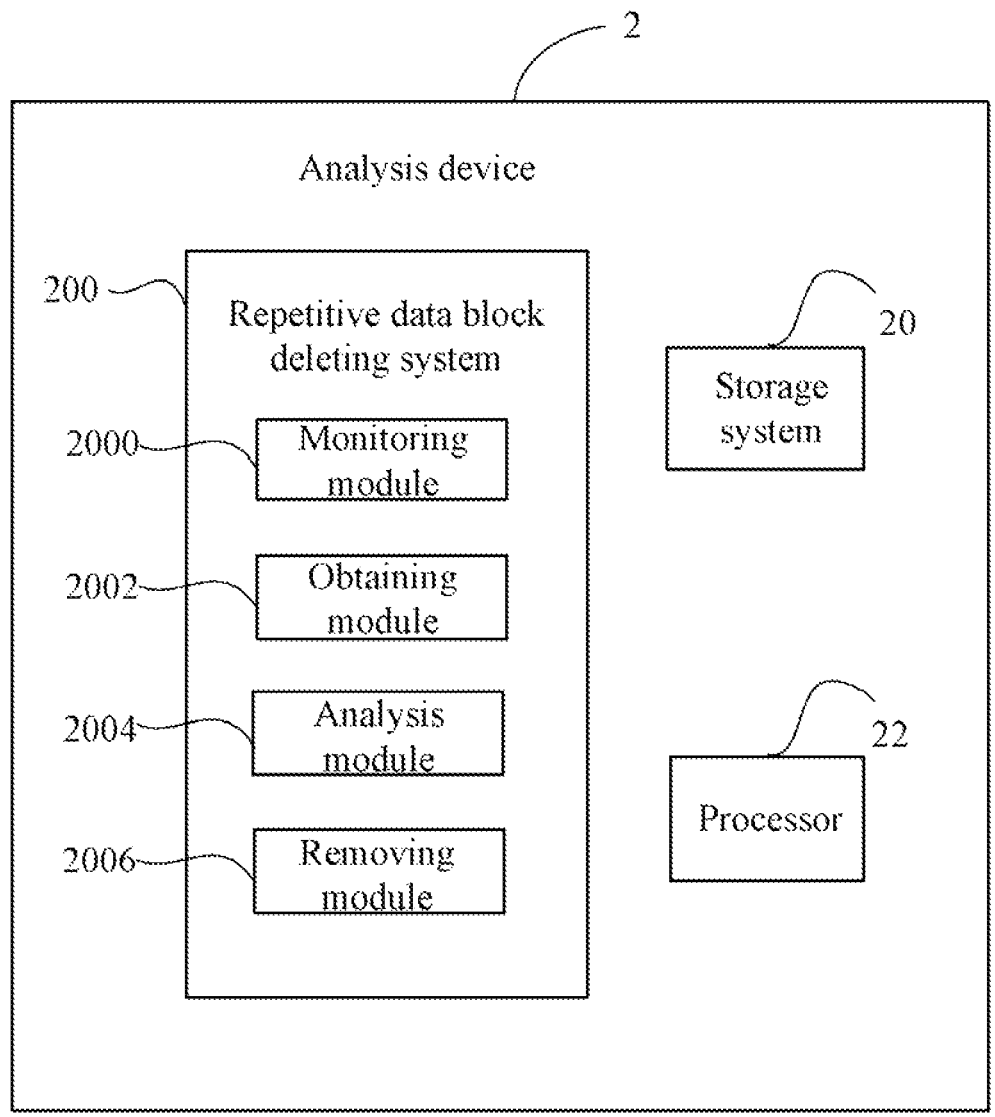
FIG. 2 is a block diagram of one embodiment of function modules of the repetitive data block deleting system in FIG. 1.

FIG. 2 is a block diagram of one embodiment of the repetitive data block deleting system 200 included in an analysis device 2 of FIG. 1. The repetitive data block deleting system 200 deletes repetitive data blocks of files from the servers 3. In one embodiment, the analysis device 2 further includes a storage system 20 and at least one processor 22. The repetitive data block deleting system 200 includes a monitoring module 2000, an obtaining module 2002, an analysis module 2004, and a removing module 2006. The modules 2000-2006 may include computerized code in the form of one or more programs that are stored in the storage system 20. The computerized code includes instructions that are executed by the at least one processor 22 to provide functions for the modules 2000-2006. The storage system 20 may be a memory, such as an EPROM memory chip, hard disk drive (HDD), or flash memory stick.

The monitoring module 2000 monitors an available storage capacity of each storage space in each server of a server cluster. In one embodiment, the analysis device 2 periodically (e.g., every one minute) accesses each server 3 of the server cluster, and the monitoring module 2000 calculates the available storage capacity of each storage space in each server. The available storage capacity of each storage space indicates how much storage space is available to store data. For example, if the available storage capacity of the storage space is 10 GB, then the storage space remains 10 GB for storing the data. In addition, the monitoring module 2000 sets a trigger event in each database 30, when a condition is meet, the database 30 having the trigger event sends the all hash lists to the analysis device 2. In detail, when the number of the hash lists stored in the database 30 exceeds a predetermined number (e.g., fifty), the database 30 is triggered by the trigger event to send all hash lists to the analysis device 2.

The obtaining module 2002 obtains all hash lists from all databases 30 of the server cluster when the available storage capacity of one storage space does not exceed a predetermined storage capacity (e.g., 10 GB). For example, if the available storage capacity of one storage space does not exceed 10 GB, the obtaining module 2002 obtains all hash lists from the database 30 of the server 3, and notify other servers 3 to send the hash lists from other databases 30 of other servers 3 to the analysis device 2.

The analysis module 2004 searches for each repetitive hash value from the obtained hash lists, and repetitive data blocks corresponding to the repetitive hash value. In one embodiment, the analysis module 2004 analyzes the obtained hash lists and searches for each repetitive hash value from the obtained hash lists. The hash value is determined as the repetitive hash value upon the condition that the hash value is the same as at least one other hash values. The data block is determined as the repetitive data block upon the condition the data block corresponds to the repetitive hash value. In other words, if the hash lists include two or more hash values which are the same, the two or more hash values are determines as the repetitive hash values, and the data block corresponding to the repetitive hash value is determined as the repetitive data block. For example, as shown in FIG. 4, the data blocks "a" and "c" stored in the storage space A and storage space N are determined as the repetitive data blocks. The data block "b" repetitively stored in the storage space A and the storage space B is determined as the repetitive data block.

The analysis module 2004 obtains a maximum storage space according to a pointer corresponding to each repetitive data block, and sends the pointer corresponding to the repetitive data block in the maximum storage space to other servers 3. In one embodiment, each data block corresponds to one pointer that points to a storage space of the server 3. Each repetitive data block also corresponds to one pointer that points to one storage space of the server 3. For example, the data block "a" stored in the storage space A corresponds to one pointer, and the data block "a" stored in the storage space N corresponds to another pointer. The maximum storage space is defined as the storage space which stores one repetitive data block and includes a maximum available storage capacity. As shown in FIG. 4, the repetitive data block "a" is stored in the storage space A and the storage B. If the available storage capacity of the storage space A is greater than the available storage capacity of the storage space B, the storage space A is regarded as the maximum storage space corresponding to the repetitive data block "a." Then the analysis module 2004 sends the pointer corresponding to the repetitive data block "a" stored in the maximum storage space to other servers 3, and the other servers also stores the repetitive data block.

The removing module 2006 updates the sent pointer in the databases 30 of other servers and deletes repetitive data blocks from the other servers 3. In one embodiment, assuming that the storage space of the server 3 stores the repetitive data block, when the server 3 receives the sent pointer, the removing module 2006 replaces the pointer corresponding to the repetitive data block in the databases 30 of the server 3 using the sent pointer, and deletes the repetitive data block from the server 3.

Figure 3:
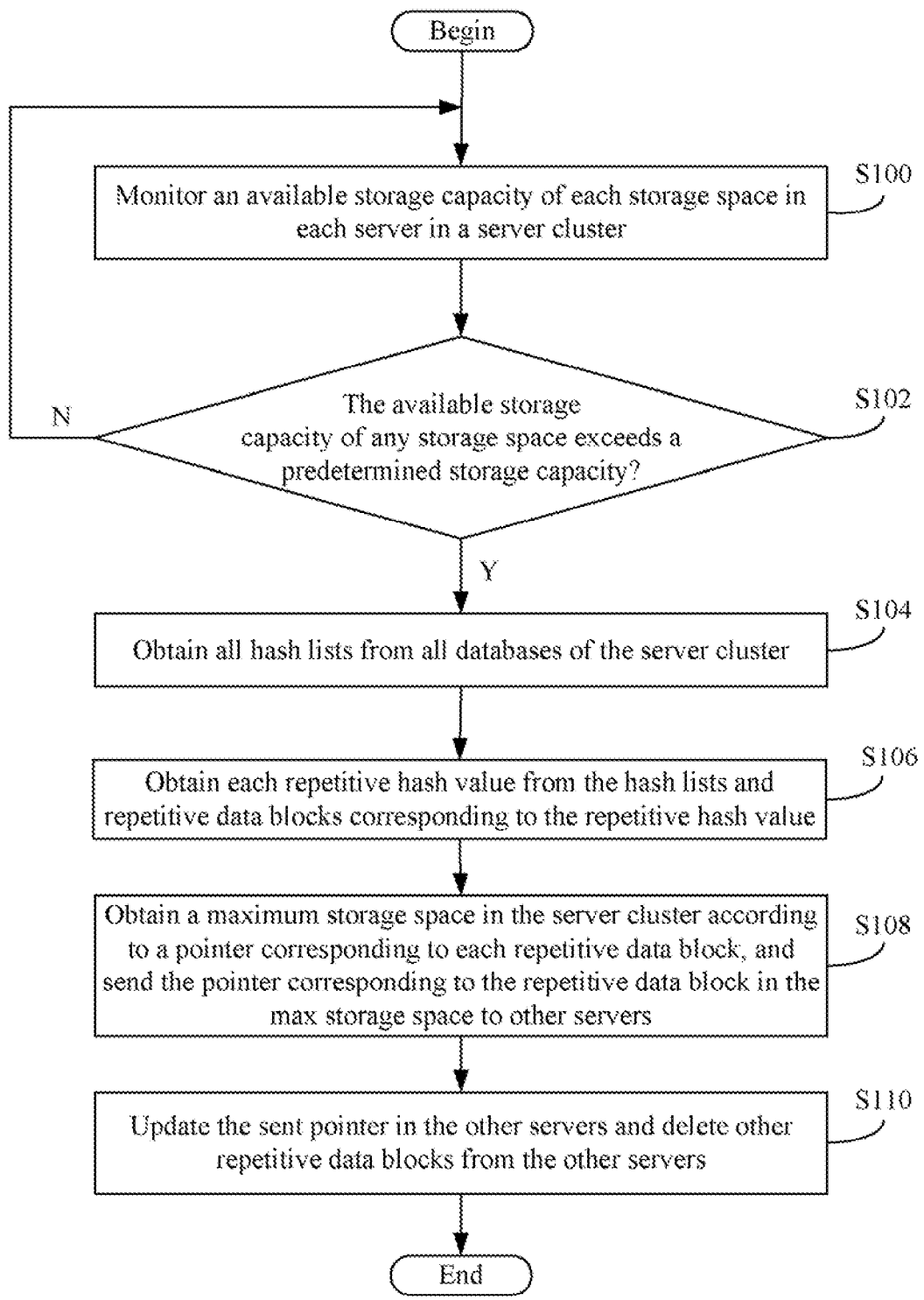
FIG. 3 is a flowchart of one embodiment of a repetitive data block deleting method.

FIG. 3 is a flowchart of one embodiment of a repetitive data block deleting method. Depending on the embodiment, additional steps may be added, others deleted, and the ordering of the steps may be changed.

In step S100, the monitoring module 2000 monitors an available storage capacity of each storage space in each server of a server cluster. In one embodiment, the monitoring module 2000 may calculate the available storage capacity of each storage space in each server 3. The monitoring module 2000 may invokes a resource manager (e.g., MICROSOFT WINDOWS SYSTEM RESOURCE MANAGER) installed in each server 3 and obtains the available storage capacity of each storage space in each server 3 from the resource manager.

In step S102, the monitoring module 2000 determines if the available storage capacity of one storage space does not exceed a predetermined storage capacity (e.g., 10 GB). For example, if the available storage capacity of one storage space does not exceed 10 GB, the procedure goes to step S104. Otherwise, if the available storage capacity of one storage space exceeds 10 GB, the procedure returns to step S100. In addition, if a trigger event is set in each database 30, when a condition is meet, the database 30 having the trigger event sends the all hash lists to the analysis device 2. In such situation, the monitoring module 2000 invokes the trigger event in each database. In detail, when the number of the hash lists stored in the database 30 exceeds a predetermined number (e.g., fifty), the procedure goes to step S104. Otherwise, when the number of the hash lists stored in the database 30 does not exceed a predetermined number (e.g., fifty), the procedure goes to step S104.

In step S104, the obtaining module 2002 obtains all hash lists from all databases 30 of the server cluster. In one embodiment, for example, if the available storage capacity of one storage space does not exceed 10 GB, the obtaining module 2002 obtains the hash lists from the database 30 of the server 3, and notify other servers 3 to send the hash lists from other databases 30 of other servers 3 to the analysis device 2.

In step S106, the analysis module 2004 searches for each repetitive hash value from the obtained hash lists, and repetitive data blocks corresponding to the repetitive hash value. In one embodiment, the analysis module 2004 analyzes the obtained hash lists and searches for each repetitive hash value from the obtained hash lists. The hash value is determined as the repetitive hash value upon the condition that the hash value is the same as at least one other hash values. In other words, if the hash lists include two or more hash values which are the same, the two or more hash values are determines as the repetitive hash values, and the data block corresponding to the repetitive hash value is determined as the repetitive data block. For example, as shown in FIG. 4, the data blocks "a" and "c" store in the storage space A and storage space N, the data blocks "a" and "c" are determined as the repetitive data block. The data block "b" stores in the storage space A and the storage space B, the data block "b" is determined as the repetitive data block.

In step S108, the analysis module 2004 obtains a maximum storage space according to a pointer corresponding to each repetitive data block, and sends the pointer corresponding to the repetitive data block in the maximum storage space to other servers 3. In one embodiment, each data block corresponds to one pointer that points to a storage space of the server 3. Each repetitive data block also corresponds to one pointer that points to one storage space of the server 3. For example, the data block "a" stored in the storage space A corresponds to one pointer, and the data block "a" stored in the storage space N corresponds to another pointer. The maximum storage space is defined as the storage space which stores one repetitive data block and includes a maximum available storage capacity. As shown in FIG. 4, the repetitive data block "a" is stored in the storage space A and the storage B, if the available storage capacity of the storage space A is greater than the available storage capacity of the storage space B, the storage space A is regarded as the maximum storage space corresponding to the repetitive data block "a," and the analysis module 2004 sends the pointer corresponding to the repetitive data block "a" stored in the maximum storage space to other servers 3, and the other servers also stores the repetitive data block.

In step S110, the removing module 2006 updates the sent pointer to the other servers and deletes repetitive data blocks from the other servers 3. In one embodiment, as shown in FIG. 4, the server A1 of the storage space A deletes the repetitive data block "a," the repetitive data block "b," and the repetitive data block "c," and updates the pointers of the repetitive data blocks "a" and "c" stored in the storage space N of the server N1 into the database 4 of the server A1, updates the pointer of the repetitive data block "b" stored in the storage space B of the server B1 into the database 4 of the server A1.

Figure 5:
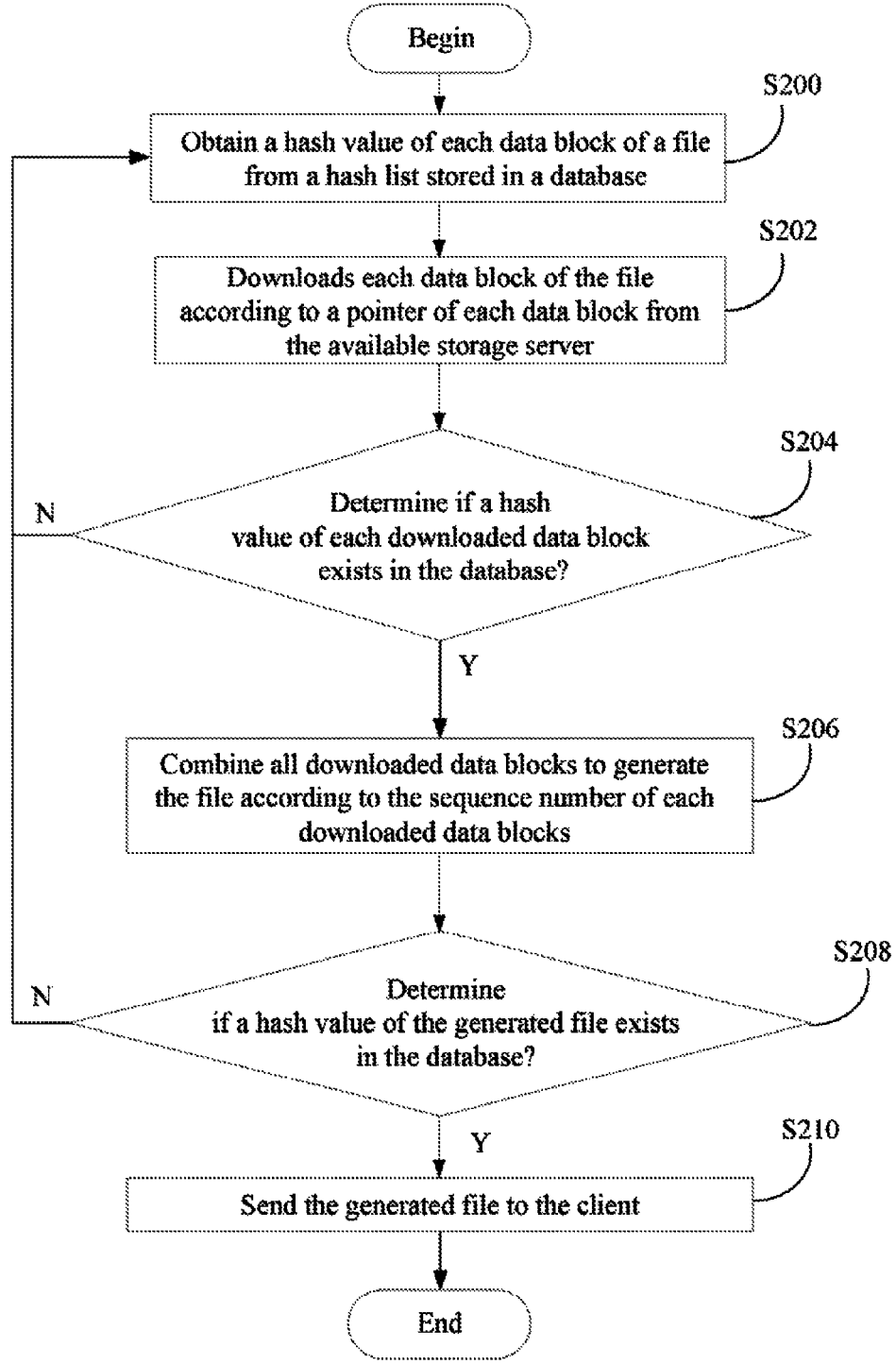
FIG. 5 is a flowchart of one embodiment of downloading a file from the one or more servers.

FIG. 5 is a flowchart of one embodiment of downloading a file from a server.

In step S200, the client obtains a hash value of each data block of a file from a hash list stored in a database 30.

In step S202, the client downloads each data block of the file according to a pointer of each data block from servers 3.

In step S204, the download module 2012 calculates a hash value of each downloaded data block and determines if the hash value of each downloaded data block exists in the hash list stored in the database 30. In one embodiment, if the calculated hash value of each downloaded data block exists in the database 30, the procedure goes to step S206. Otherwise, if one calculated hash value of the downloaded data block does not exist in the hash list, the procedure returns to step S200.

In step S206, the client combines all downloaded data blocks to generate the file in the temporary storage space of the client according to the name of each downloaded data block. The temporary storage space of the client may be, but is not limited to, a random access memory (RAM). In one embodiment, due to the name of each downloaded data block is generated in order, and the client combines all downloaded data blocks to generate the file in order of the name of each downloaded data block.

In step S208, the client calculates the hash value of the generated file and determines if the calculated hash value of the generated file exists in the hash list stored in the database 30. If the calculated hash value of the generated file exists in the hash list, the procedure goes to step S210. If the calculated hash value of the generated file does not exists in the hash list, the client displays fail information (e.g., display "FAIL") on the display device of the client, and the procedure returns to step S200.

In step S210, the client displays the generated file and success information (e.g., display "SUCCESS") on a display device of the client Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An analysis device in electronic communication with a plurality of servers in a server cluster, each server comprising data blocks of files, comprising:
   at least one processor; and
   a storage system that stores one or more programs, when executed by the at least one processor, cause the at least one processor to perform a repetitive data block deleting method, the method comprising:
   monitoring an available storage capacity of each storage space in each server of the server cluster;
   obtaining all hash lists from all databases of the server cluster when the available storage capacity of one storage space does not exceed a predetermined storage capacity;
   searching for each repetitive hash value from the obtained hash lists, and repetitive data blocks corresponding to the repetitive hash value;
   obtaining a maximum storage space according to a pointer corresponding to each repetitive data block, and sending the pointer corresponding to the repetitive data block in the maximum storage space to other servers, wherein the maximum storage space is defined as the storage space that already stores one repetitive data block and remains a maximum available storage capacity for storing data; and
   deleting repetitive data blocks from the other servers.

2. The analysis device of claim 1, wherein each data block comprises a name, and the name of each data block is generated in an alphabetical order or in a numerical order.

3. The analysis device of claim 1, wherein the hash value is determined as a repetitive hash value upon the condition that the hash value is the same as at least one other hash values.

4. The analysis device of claim 3, wherein the data block is determined as the repetitive data block upon the condition the data block corresponds to the repetitive hash value.

5. The analysis device of claim 2, wherein a method of downloading the file from the server comprises:
   the client obtains the hash value of each data block of the file from the hash list stored in the database;
   the client downloads each data block of the file according to the pointer of each data block from the server;
   the client calculates a hash value of each downloaded data block, and determines if the hash value of each downloaded data block exists in the hash list stored in the database;
   the client combines all downloaded data blocks to generate the file in the client according to the name of each downloaded data block, when the hash value of each downloaded data block exists in the hash list stored in the database;
   the client calculates the hash value of the generated file and determines if the calculated hash value of the generated file exists in the hash list stored in the database; and
   the client displays the generated file when the calculated hash value of the generated file exists in the hash list stored in the database.

6. A repetitive data block deleting method implemented by an analysis device, the analysis device in electronic communication with a plurality of servers in a server cluster, each server comprising data blocks of files, the method comprising:
   monitoring an available storage capacity of each storage space in each server of the server cluster;

obtaining all hash lists from all databases of the server cluster when the available storage capacity of one storage space does not exceed a predetermined storage capacity;

searching for each repetitive hash value from the obtained hash lists, and repetitive data blocks corresponding to the repetitive hash value;

obtaining a maximum storage space according to a pointer corresponding to each repetitive data block, and sending the pointer corresponding to the repetitive data block in the maximum storage space to other servers, wherein the maximum storage space is defined as the storage space that already stores one repetitive data block and remains a maximum available storage capacity for storing data; and deleting repetitive data blocks from the other servers.

7. The method of claim 6, wherein each data block comprises a name, and the name of each data block is generated in an alphabetical order or in a numerical order.

8. The method of claim 6, wherein the hash value is determined as a repetitive hash value upon the condition that the hash value is the same as at least one other hash values.

9. The method of claim 8, wherein the data block is determined as the repetitive data block upon the condition the data block corresponds to the repetitive hash value.

10. The method of claim 7, wherein a method of downloading the file from the server comprises:

the client obtains the hash value of each data block of the file from the hash list stored in the database;

the client downloads each data block of the file according to the pointer of each data block from the server;

the client calculates a hash value of each downloaded data block, and determines if the hash value of each downloaded data block exists in the hash list stored in the database;

the client combines all downloaded data blocks to generate the file in the client according to the name of each downloaded data block, when the hash value of each downloaded data block exists in the hash list stored in the database;

the client calculates the hash value of the generated file and determines if the calculated hash value of the generated file exists in the hash list stored in the database; and the client displays the generated file when the calculated hash value of the generated file exists in the hash list stored in the database.

11. A repetitive data block deleting method implemented by an analysis device, the analysis device in electronic communication with a plurality of servers in a server cluster, each server comprising data blocks of files, the method comprising:

setting a trigger event in each database of the server cluster;

triggering each database by the trigger event to send all hash lists to the analysis device when the number of the hash lists stored in the database exceeds a predetermined number;

searching for each repetitive hash value from the obtained hash lists, and repetitive data blocks corresponding to the repetitive hash value;

obtaining a maximum storage space according to a pointer corresponding to each repetitive data block, and sending the pointer corresponding to the repetitive data block in the maximum storage space to other servers, wherein the maximum storage space is defined as the storage space that already stores one repetitive data block and remains a maximum available storage capacity for storing data; and deleting repetitive data blocks from the other servers.

12. The method of claim 11, wherein each data block comprises a name, and the name of each data block is generated in an alphabetical order or in a numerical order.

13. The method of claim 11, wherein the hash value is determined as a repetitive hash value upon the condition that the hash value is the same as at least one other hash values.

14. The method of claim 13, wherein the data block is determined as the repetitive data block upon the condition the data block corresponds to the repetitive hash value.

15. The method of claim 12, wherein a method of downloading the file from the server cluster comprises:

the client obtains the hash value of each data block of the file from the hash list stored in the database;

the client downloads each data block of the file according to the pointer of each data block from the server;

the client calculates a hash value of each downloaded data block, and determines if the hash value of each downloaded data block exists in the hash list stored in the database;

the client combines all downloaded data blocks to generate the file in the client according to the name of each downloaded data block, when the hash value of each downloaded data block exists in the hash list stored in the database;

the client calculates the hash value of the generated file and determines if the calculated hash value of the generated file exists in the hash list stored in the database; and the client displays the generated file when the calculated hash value of the generated file exists in the hash list stored in the database.

* * * * *